(12) United States Patent  
Wright

(10) Patent No.: US 8,201,767 B2
(45) Date of Patent: Jun. 19, 2012

(54) COMMINUTING DEVICE WITH REMOVABLE BEARING

(75) Inventor: Kevin Barry Wright, Senoia, GA (US)

(73) Assignee: Harris Waste Management Group, Inc., Peachtree City, GA (US)

(*) Notice: Subject to any disclaimer, the term of this patent is extended or adjusted under 35 U.S.C. 154(b) by 149 days.

(21) Appl. No.: 12/719,557

(22) Filed: Mar. 8, 2010

(65) Prior Publication Data

US 2011/0215181 A1  Sep. 8, 2011

(51) Int. Cl.
*B02C 1/00* (2006.01)
*B02C 19/00* (2006.01)
*B02C 21/00* (2006.01)
*B02C 23/00* (2006.01)

(52) U.S. Cl. ...... 241/262; 241/270; 241/283; 241/285.1

(58) Field of Classification Search .................. 241/262, 241/270, 283, 285.1, 285.2, 285.3
See application file for complete search history.

(56) References Cited

U.S. PATENT DOCUMENTS

| 3,141,401 A * | 7/1964 | Lindemann et al. ........ 100/98 R |
| 3,831,866 A * | 8/1974 | Phillips ........................... 241/63 |
| 3,945,315 A * | 3/1976 | Dahlem et al. .................. 100/95 |
| 4,007,677 A * | 2/1977 | Fox .................................. 100/45 |
| 4,165,045 A * | 8/1979 | Hager et al. .................. 241/282 |
| 4,213,385 A * | 7/1980 | Dahlem .......................... 100/95 |
| 4,744,396 A | 5/1988 | Smith |
| 5,410,929 A * | 5/1995 | Wallace .......................... 83/160 |
| 5,478,020 A | 12/1995 | Chambers, Sr. et al. |
| 5,580,009 A | 12/1996 | Kennedy |
| 6,565,026 B1 | 5/2003 | Hall |
| 2005/0223915 A1* | 10/2005 | Van Der Beek et al. ...... 100/214 |

* cited by examiner

*Primary Examiner* — Bena Miller

(74) *Attorney, Agent, or Firm* — Perman & Green, LLP

(57) ABSTRACT

A comminuting device for comminuting material. The device has a frame and a shear member having a main blade, the shear member movably coupled to the frame with a shear member slide bearing located at least partially inside the frame. A supporting table is coupled to the frame, the supporting table having a counter blade, the supporting table adapted to support the scrap material. The frame has an opening forming an access way to the shear member slide bearing. The main blade and the counter blade cooperate to chop the scrap material when the shear member is moved from a first position to a second position. The shear member slide bearing is removable from inside the frame through the opening without removal of the shear member from the frame.

21 Claims, 5 Drawing Sheets

COMMINUTING DEVICE WITH REMOVABLE BEARING

BACKGROUND

1. Field of the Disclosed Embodiments

The disclosed embodiments relate to a comminuting device for comminuting scrap and, more particularly, shears for chopping scrap having removable bearings.

2. Brief Description of Earlier Developments

Scrap material such as metal, and non-metallic (e.g. paper or plastic) scrap may be comminuted using shears and hydraulic cylinders where the material is stepwise moved into the shears, clamped and chopped with the shears with the hydraulic cylinders driving both the clamp and the shears. The clamp and shears are typically mounted in a frame with linear bearing sets which over time are subject to wear, corrosion and jamming. As such, the linear bearings either need to be serviced or replaced periodically in order to consistently process scrap material. In order to service the linear bearings, the cross head, to which the movable shearing portion of the shears is mounted, is typically removed from the frame. Similarly, in order to service the linear bearings, the clamp is typically removed and the bearings serviced or replaced. Removal typically involves a partial teardown of the equipment, such as de coupling hydraulics and removing portions of the equipment that impede removal of the cross head and clamp. Removal of the cross head and clamp typically involves the use of a crane and is time consuming. A problem arises where servicing the bearings involves extensive down time, the use of expensive capital equipment and labor. Accordingly, there is a desire to be able to service and replace the linear bearings with minimal down time and at minimal expense.

SUMMARY OF THE EXEMPLARY EMBODIMENTS

In accordance with one exemplary embodiment, shears are provided for chopping scrap material. The shears have a frame and a shear member having a main blade, the shear member movably coupled to the frame with a shear member slide bearing located at least partially inside the frame. A supporting table is coupled to the frame, the supporting table having a counter blade, the supporting table adapted to support the scrap material. The frame has an opening forming an access way to the shear member slide bearing. The main blade and the counter blade cooperate to chop the scrap material when the shear member is moved from a first position to a second position. The shear member slide bearing is removable from inside the frame through the opening without removal of the shear member from the frame.

In accordance with another exemplary embodiment, shears are provided for chopping scrap material. The shears have a frame and a shear member having a main blade, the shear member movably coupled to the frame with a shear member slide bearing located at least partially inside the frame. A supporting table is coupled to the frame, the supporting table having a counter blade, the supporting table adapted to support the scrap material. A clamp member is movably coupled to the frame with a clamp member slide bearing located at least partially inside the frame. The frame has a first opening forming an access way to the shear member slide bearing and the frame has a second opening forming an access way to the clamp member slide bearing. The main blade and the counter blade cooperate to chop the scrap material when the shear member is moved from a first position to a second position while the clamp member holds the scrap material stationary. The shear member slide bearing is removable from inside the frame through the first opening without removal of the shear member from the frame. The clamp member slide bearing is removable from inside the frame through the second opening without removal of the clamp member from the frame.

In accordance with another exemplary embodiment shears are provided for chopping scrap material. The shears have a frame and a shear member having a main blade, the shear member movably coupled to the frame with a shear member slide bearing located at least partially inside the frame. A supporting table is coupled to the frame, the supporting table having a counter blade, the supporting table adapted to support the scrap material. The frame has an opening forming an access way to the shear member slide bearing. The main blade and the counter blade cooperate to chop the scrap material when the shear member is moved from a first position to a second position. The shear member slide bearing is removable from inside the frame through the opening without removal of the shear member from the frame. The shear member slide bearing has a guiding feature constraining the shear member slide bearing to be removable through the opening in a direction perpendicular to the motion of the shear member.

BRIEF DESCRIPTION OF THE DRAWINGS

The foregoing aspects and other features of the exemplary embodiments are explained in the following description, taken in connection with the accompanying drawings, wherein.

DETAILED DESCRIPTION OF THE EXEMPLARY EMBODIMENT(S)

Figure 1:
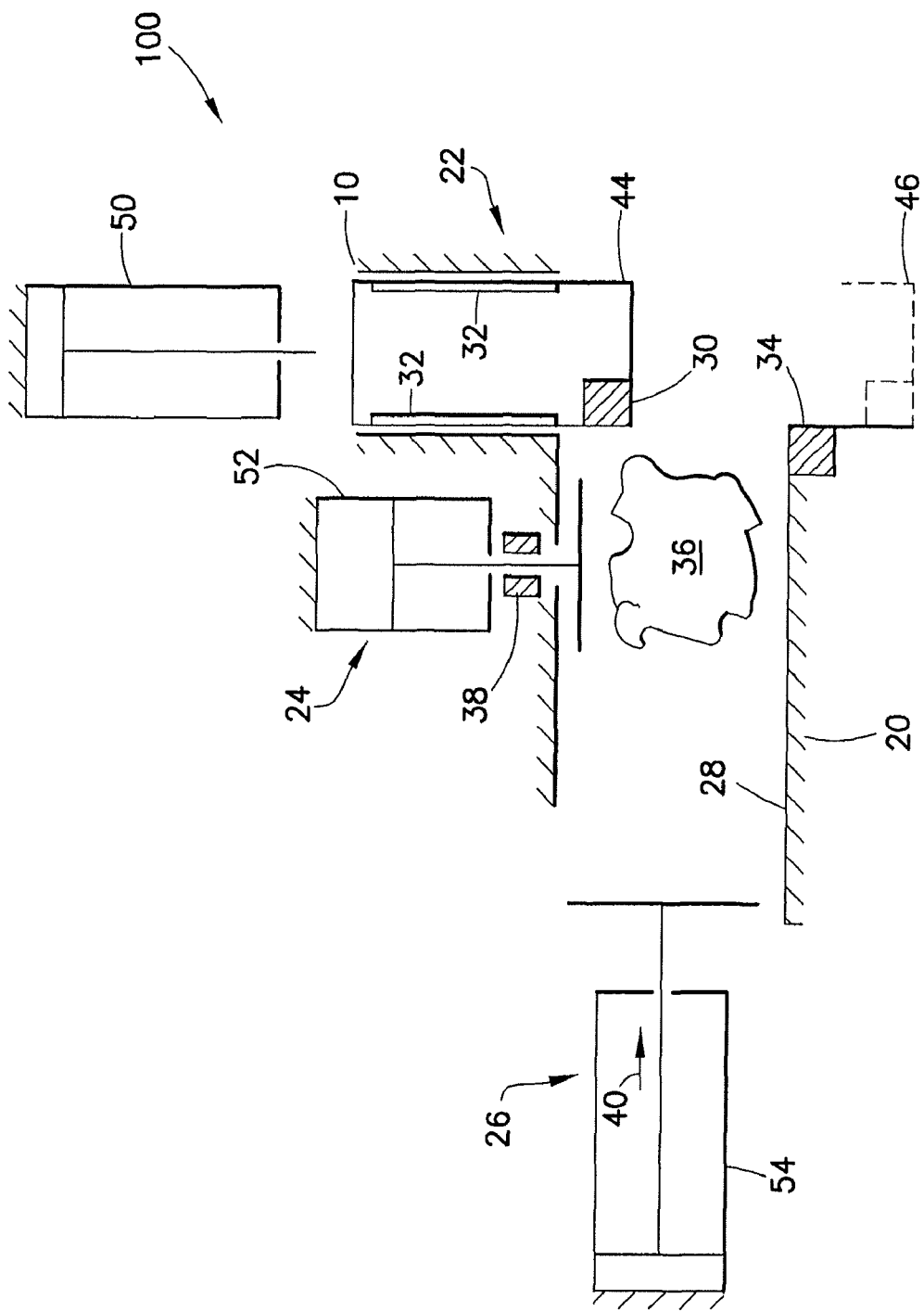
FIG. 1 is a schematic section view of a comminuting device incorporating features in accordance with an exemplary embodiment of the present invention.

Referring to FIG. 1, there is shown, a schematic section view of a comminuting device incorporating features in accordance with an exemplary embodiment of the present invention. Although the present invention will be described with reference to the embodiments shown in the drawings, it should be understood that the present invention can be embodied in many alternate forms of embodiments. In addition, any suitable size, shape or type of elements or materials could be used.

Referring still to FIG. 1, there is shown a representative comminuting device 100 for comminuting material 36 (such as scrap metal, or paper or plastic scrap) and having removable bearings and further features facilitating such removal without significant disassembly of the device as described below. The configuration of the device 100 shown in FIG. 1 is merely exemplary and in alternate embodiments the device may have any other suitable configuration. In the exemplary embodiment, the comminuting device 100 may generally have a shear assembly 10 for chopping and comminuting material fed or driven by a ram or driver into the shear assembly. Shear assembly 10 may generally have a frame 20 to which cross head or shear member 22, clamp 24, ram 26 and table 28 are coupled. Frame 20 forms a holding chamber with one or more rams 26 that may move the material towards the shears. In the embodiment shown, cross head 22 is the component of the shear that reciprocates into and out of a cutting plane shearing or parting scrap held in place by clamp 24, which holds the target material 36 rigidly against a stationary table 28, into smaller pieces. Cross head or shear member 22 has a main blade 30 where shear member 22 is movably coupled to 20 frame with shear member slide bearing 32 located at least partially inside of frame 20. Supporting table 28 is also coupled to frame 20 with supporting table 28 having counter blade 34 where supporting table 20 is adapted to support the scrap material 36 to be sheared. Clamp member 24 is movably coupled to frame 20 with clamp member slide bearing 38 also located at least partially inside frame 20.

As will be described in greater detail below, frame 20 has first opening(s) forming access way(s) to the shear member slide bearing 32 and second opening(s) forming access way (s) to the clamp member slide bearing 38. Ram 26 is provided to compact material 36 in direction 40. Shear ram 26 is shown as being shaft driven hydraulically by applying pressure to a piston. Main blade 30 and counter blade 34 cooperate to shear the scrap material 36 when shear member 22 is moved from first position 44 to second position 46 while the clamp member 24 holds the scrap material stationary. Clamp device 24 is disposed in frame 20 and is cycled to capture and hold the material 36 when sheared. Hydraulic cylinders 50, 52 and 54 may be provided to actuate shear member 22, clamp 24 and ram 26 respectively. In alternate embodiments, any suitable actuating member may be provided. Clamp 24 is driven by hydraulic cylinder 52 (as may be realized removal of the hydraulic cylinder 52 from the clamp 24 may be time consuming and difficult resulting in extended shutdown periods of the device). In the disclosed embodiment, cross head 22 with blade 30 is cycled against opposing fixed knife/blade 34 resulting in shearing of materials 36 when cross head 22 is moved to closed shear position 46. Cross head 22 is hydraulically powered and may be a heavy structural member for rigidity to facilitate shearing of materials. As such, removal of cross head 22 from the frame may also be time consuming and difficult. As will be described in greater detail below, the shear member slide bearing is removable from inside the frame through the first opening without removal of the shear member from the frame. As will be described in greater detail below, the clamp member slide bearing is removable from inside the frame through the second opening without removal of the clamp member from the frame.

Figure 2:
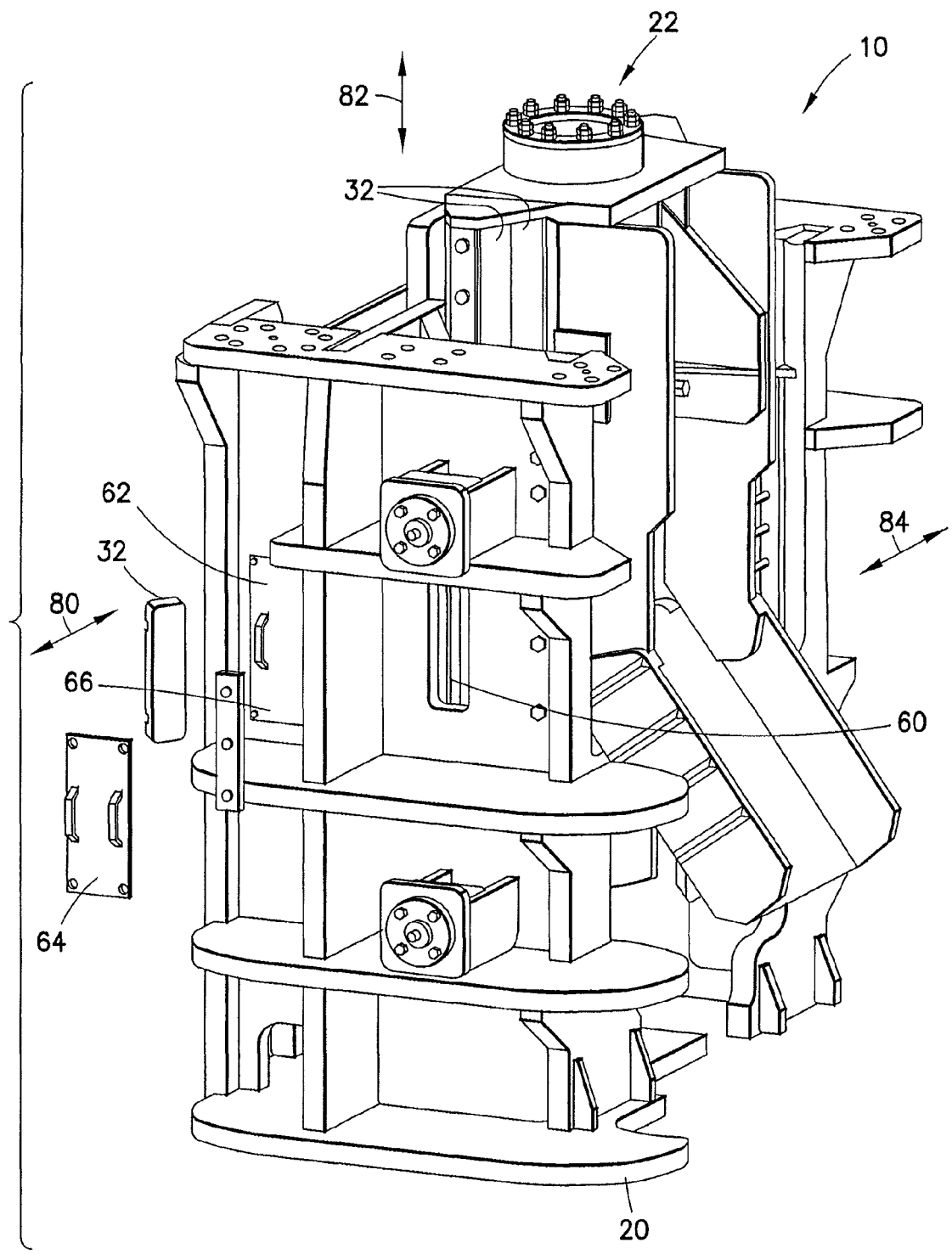
FIG. 2 is an isometric view of a shear assembly portion, of the comminuting device, shown in FIG. 1 with the cylinder assembly removed for clarity.
Figure 3:
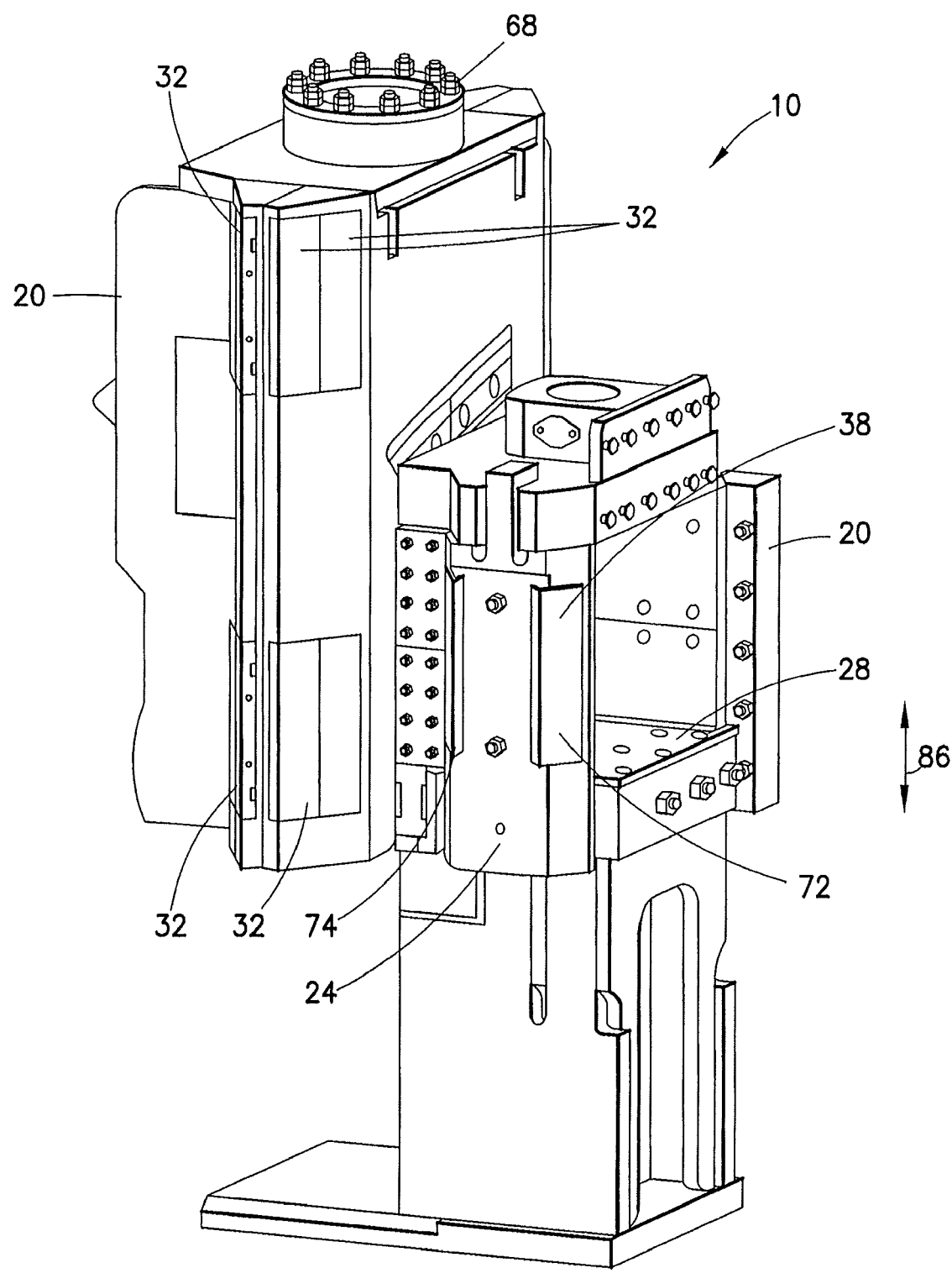
FIG. 3 is another isometric view of a shear assembly (as seen from an opposite direction than the view in FIG. 2) with the frame assembly removed for clarity.
Figure 6A:
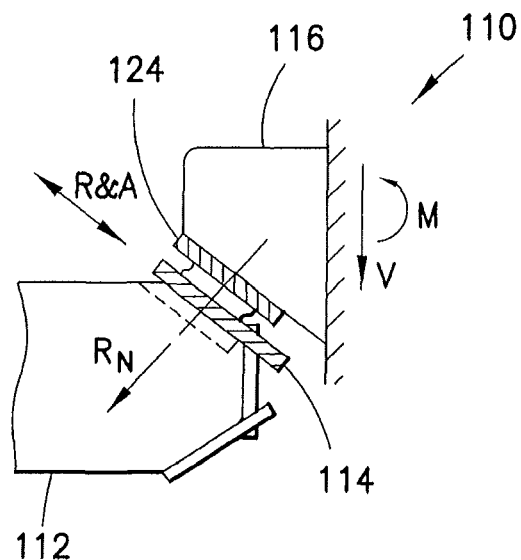
FIGS. 6A-6B are respectively a partial plan view of the shear assembly and a partial isometric view in accordance with another exemplary embodiment.
Figure 6B:
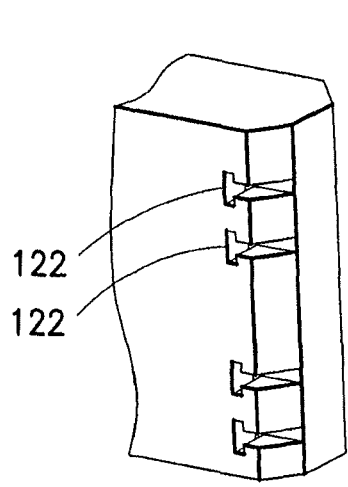

Referring now to FIG. 2, there is shown an isometric view of shear assembly 10 with the cylinder assemblies removed for clarity. Referring also to FIG. 3, there is shown an isometric view of shear assembly 10 with frame assembly removed for clarity. As noted previously, shear assembly 10 has frame 20 to which cross head or shear member 22, clamp 24 and table 28 are coupled. Clamp member 24 is movably coupled to frame 20 with clamp member slide bearing 38 also located at least partially inside frame 20. In the exemplary embodiment, clamp device 24 is provided with linear bearing pairs where bearings in each pair are on opposing angled or dovetail sides (see also FIGS. 6A-6B, showing a similar configuration in accordance with another exemplary embodiment). The linear bearings of each bearing pair are arranged to generate balanced bearing forces and the bearing pairs are located around the clamp device to stably hold the clamp device in the frame during sliding motion of the clamp relative to the frame. In the embodiment shown, two pairs are provided. In alternate embodiments, any suitable number may be provided. Cross head 22 is shown with a similar configuration but in the exemplary embodiment is provided with two upper pairs and two lower pairs of bearings for stability and anti jamming. In alternate embodiments, any suitable number may be provided. In the embodiment shown, bearings are shown mounted to the clamp or shear member. In alternate embodiments, the bearings may be mounted to the frame only or to both or in any suitable combination. In other alternate embodiments, linear slide bearing may be provided individually or in pairs similar to the previously described on the ram(s) 26 of the device.

In the exemplary embodiment, frame 20 has a first opening 60 forming an access way from the exterior of the frame to the shear member slide bearing 32 and a second opening forming an access way to the clamp member slide bearing 38. In the exemplary embodiments openings 60, 62 are formed through the side walls of the frame surrounding the clamp assembly 24 and shear member 22 and provide an access way through frame 20 to the bearings. Currently, one access way is sized sufficiently for both slide bearings from the pair on each side to come out through the common access way. Here, frame 20 provided with an access way for installing and removing both bearings from each pair through single access way. In the exemplary embodiment, each bearing 32 of the pair may be include two independently and separately removable side by side bearing sections, for ease of removal installation, and in alternate embodiments may be one or more pieces. With two separately removable bearing surfaces, one part of the bearing on a given side may be removed if desired depending on wear and there may not be a need to replace all of the bearing surfaces. Here, the access way 60 may also allow unobstructed inspection of the bearings 32 through the frame wall. In this example, one access way (on each side of frame) may be used to install or remove the bearings from an adjacent side of the cross head. For example, opening 60 may be used by placing the head down to get to the upper bearings and then to move the head up to get to the lower bearings. Access panels 64 and 66 are provided to cover openings 60, 62 respectively. Similarly, on opposing sides of shear assembly 10, similar features may be provided. By way of example, protective cover plates 64, 66 may be removed from the structural assembly of the shear assembly, a bearing retainer removed, and the bearings 32 pulled out perpendicular to the reciprocating line of action of the cross head. Here, shear member slide bearing 32 is removable from inside the frame through the first opening 60 without removal of the shear member from the frame. Similarly, clamp member slide bearing 38 is removable from inside the frame through the second opening 62 without removal of the clamp member from the frame. In alternate embodiments, any suitable bearings or openings for access may be provided. In the event that the bearings 32 are jamming in the geometry to support the friction and gravity loads, the openings and resultant access way through the frame wall may provide additional geometry (i.e. available freedom of motion) for a person to produce forces against the bearings (e.g. leveraging, prying or off axis forces) and or the gross head clamp for removal using simple hand tools. The access geometry to the internal bearing made available by the access way for hand tools to reposition the cross head, if desired for bearing installation or removal, and should that fail adjustment of the guides (see also FIGS. 6A-6B) would extend the available motion of the cross head for installation of new bearings. In the embodiment shown, shear member slide bearing 32 may be interchangeable with clamp member slide bearing 38. In alternate embodiments, the bearings may be different and unique.

In the embodiment shown, shear member slide bearing 32 is coupled to shear member 22 and clamp member slide bearing 38 is coupled to the clamp member where any suitable method of coupling allowing removal of the bearings through the access way openings may be provided. In the embodiment shown, the shear member slide bearing comprises four opposing sets of two bearing surfaces 68, 70 angled 90 degrees relative to each other. Similarly, clamp member slide bearing 38 comprises two opposing sets of bearing surfaces 72, 74 angled 90 degrees relative to each other. In alternate embodiments, any suitable angle or combinations of angles may be used. Here, shear member slide bearing 32 comprises two slide bearing surfaces 68, that are removable from inside frame 20 through a first common opening 60. Similarly, clamp member slide bearing 38 comprises two clamp bearing surfaces 72, 74 removable from inside frame 20 through second common opening 62. Here, shear member slide bearing 32 is removable through the first opening 60 in a direction 80 perpendicular to the motion 82 of shear member 22. Similarly, clamp member slide bearing 38 is removable through the second opening 62 in a direction 84 perpendicular to the motion 86 of clamp member 24. As will be described in greater detail below, shear member slide bearing 32 has a guiding feature constraining the shear member slide bearing to be removable through the opening in direction 80 perpendicular to the motion 82 of shear member 22.

Figure 4:
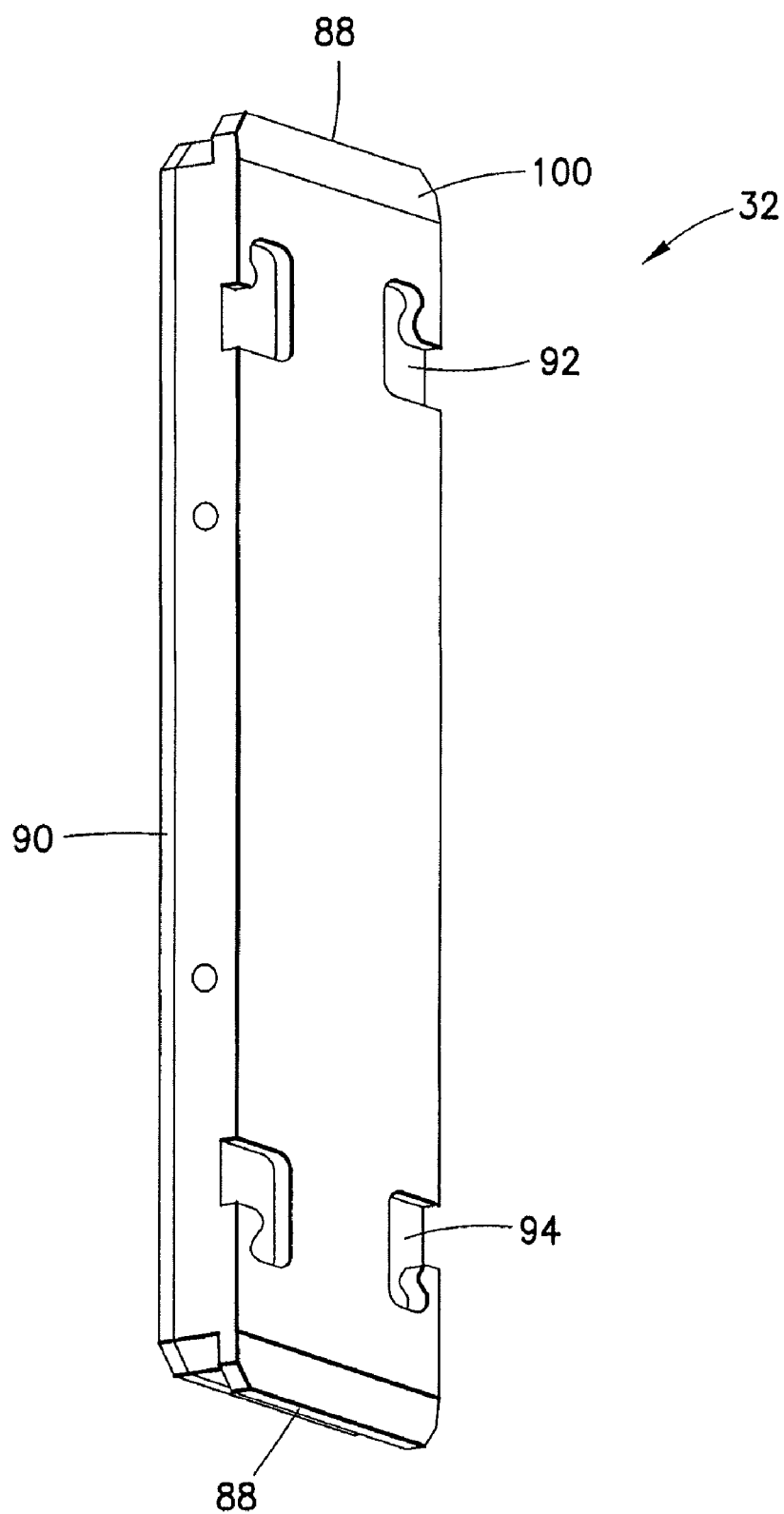
FIG. 4 is an isometric view of a bearing in accordance with an exemplary embodiment.

Referring now to FIG. 4, there is shown an isometric view of bearing 32. Bearing 32 has a guiding feature 88 constraining bearing 32 to be removable through the opening in a direction perpendicular to the motion of shear member 22 where member 22 has a similar mating feature in which to capture guiding feature 88. Here, guiding features 88 mate with a mating key way/guide slot allow mounting and removal of the bearings to the seating surface of the shear member or the clamp. Mating guide slots in the shear member and the clamp are oriented to allow for an installation and removal path to extend through the access way. Seating surfaces are provided on the shear member and on the clamp member and mating bearing surfaces on the frame and may be removably mounted where the seating surfaces may be controlled to allow the respective bearings to be removed and replaced without shimming. A side retainer may be provided and fastened to frame or may also be fastened to bearing to hold the bearings in position. In the embodiment shown, the guide slot configuration has extending flanges that form an L shaped rail/key surfaces. In alternate embodiments, any suitable shape may be provided. Notches 92, 94 in the bottom of bearing may be formed for an extraction tool where any suitable shape in any surface including side edge face facing access way may be provided for tooling. In the embodiment shown, bearing 32 has bearing material 98 and supporting material 100. Bearing material 98 may be oil impregnated bronze or any suitable material. Supporting material 100 may be carbon steel or any suitable material. Although bearing 32 is shown as a surface type bearing, any suitable type of bearing may be provided, for example, ball or roller bearings or any suitable bearing type.

Figure 5:
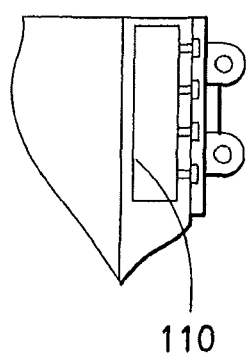
FIG. 5 is a partial top view of an alternate embodiment bearing.
Figure 7:
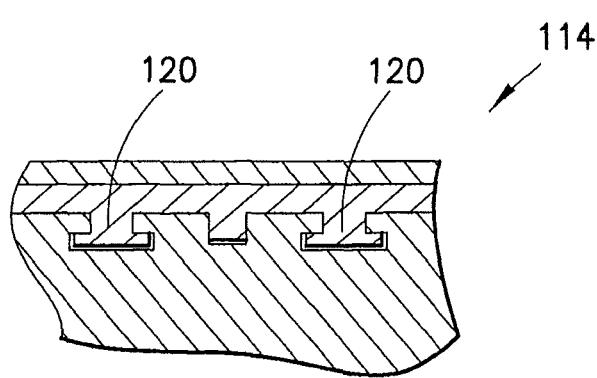
FIG. 7 is a partial isometric view of a bearing to seating member interface of the shear assembly in accordance with another exemplary embodiment.

Referring now to FIG. 5, there is shown a partial top view of an alternate embodiment bearing 110. Referring also to FIG. 6, there is shown a partial isometric view of an alternate embodiment cross head 112. Referring also to FIG. 7, there is shown a partial isometric view of an alternate embodiment bearing 114. In the embodiment shown, bearing surface 124 is coupled to frame 116 and bearing 114 is coupled to cross head 112. In the embodiment shown, bearing 114 is provided with T shaped guiding key way features 120 that mate with T slot guides 122 in cross head 112. In alternate embodiments any suitable guide shape may be provided, for example a dovetail shape, rectangular shape or any other suitable shape may be provided.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A comminuting device for comminuting material, the device comprising:
   a frame;
   a shear member having a main blade, the shear member movably coupled to the frame with a shear member slide bearing having multiple removable bearing surfaces located at least partially inside the frame;
   a supporting table coupled to the frame, the supporting table having a counter blade, the supporting table adapted to support the scrap material; and
   the frame having an opening forming an access way to the shear member slide bearing;
   wherein, the main blade and the counter blade cooperate to chop the scrap material when the shear member is moved from a first position to a second position, and wherein each of the multiple removable bearing surfaces of the shear member slide bearing is removable from inside the frame through the opening without removal of the shear member from the frame.

2. The device of claim 1 wherein the shear member slide bearing is coupled to the shear member.

3. The device of claim 1, wherein the shear member slide bearing comprises two bearing surfaces angled relative to each other.

4. The device of claim 1 further comprising a clamp member movably coupled to the frame with a clamp member slide bearing located at least partially inside the frame.

5. The device of claim 1, wherein the shear member slide bearing comprises two bearing surfaces, the two bearing surfaces removable from inside the frame through a common opening.

6. The device of claim 1, wherein the shear member slide bearing is removable through the opening in a direction perpendicular to the motion of the shear member.

7. The device of claim 1 wherein the shear member slide bearing has a guiding feature constraining the shear member slide bearing to be removable through the opening in a direction perpendicular to the motion of the shear member.

8. A comminuting device for comminuting material, the device comprising:
   a frame;
   a shear member having a main blade, the shear member movably coupled to the frame with a shear member slide bearing having multiple removable shear bearing surfaces located at least partially inside the frame;
   a supporting table coupled to the frame, the supporting table having a counter blade, the supporting table adapted to support the scrap material;

a clamp member movably coupled to the frame with a clamp member slide bearing having multiple removable clamp bearing surfaces located at least partially inside the frame;

the frame having a first opening forming an access way to the shear member slide bearing; and the frame having a second opening forming an access way to the clamp member slide bearing;

wherein, the main blade and the counter blade cooperate to chop the scrap material when the shear member is moved from a first position to a second position while the clamp member holds the scrap material stationary, and wherein each of the multiple removable shear bearing surfaces of the shear member slide bearing is removable from inside the frame through the first opening without removal of the shear member from the frame, and wherein each of the multiple removable clamp bearing surfaces of the clamp member slide bearing is removable from inside the frame through the second opening without removal of the clamp member from the frame.

9. The device of claim 8 wherein the shear member slide bearing is interchangeable with the clamp member slide bearing.

10. The device of claim 8 wherein the shear member slide bearing is coupled to the shear member.

11. The device of claim 8 wherein the shear member slide bearing comprises two bearing surfaces angled relative to each other, and wherein the clamp member slide bearing comprises two bearing surfaces angled relative to each other.

12. The device of claim 8 wherein the clamp member slide bearing is coupled to the clamp member.

13. The device of claim 8 wherein the shear member slide bearing comprises two slide bearing surfaces, the two slide bearing surfaces removable from inside the frame through a first common opening, and wherein the clamp member slide bearing comprises two clamp bearing surfaces, the two clamp bearing surfaces removable from inside the frame through a second common opening.

14. The device of claim 8 wherein the shear member slide bearing is removable through the first opening in a direction perpendicular to the motion of the shear member, and wherein the clamp member slide bearing is removable through the second opening in a direction perpendicular to the motion of the clamp member.

15. The device of claim 8 wherein the shear member slide bearing has a guiding feature constraining the shear member slide bearing to be removable through the opening in a direction perpendicular to the motion of the shear member.

16. A comminuting device for comminuting material, the device comprising:

a frame;

a shear member having a main blade, the shear member movably coupled to the frame with a shear member slide bearing having multiple removable bearing surfaces located at least partially inside the frame;

a supporting table coupled to the frame, the supporting table having a counter blade, the supporting table adapted to support the scrap material; and the frame having an opening forming an access way to the shear member slide bearing;

wherein, the main blade and the counter blade cooperate to chop the scrap material when the shear member is moved from a first position to a second position, and wherein each of the multiple removable bearing surfaces of the shear member slide bearing is removable from inside the frame through the opening without removal of the shear member from the frame, and wherein the shear member slide bearing has a guiding feature constraining the shear member slide bearing to be removable through the opening in a direction perpendicular to the motion of the shear member.

17. The device of claim 15 wherein the shear member slide bearing is coupled to the shear member.

18. The device of claim 15 wherein the shear member slide bearing comprises two bearing surfaces angled relative to each other.

19. The device of claim 15 further comprising a clamp member movably coupled to the frame with a clamp member slide bearing located at least partially inside the frame.

20. The device of claim 15 wherein the shear member slide bearing comprises two bearing surfaces, the two bearing surfaces removable from inside the frame through a common opening.

21. The device of claim 15 further comprising a clamp member movably coupled to the frame with a clamp member slide bearing located at least partially inside the frame, the clamp member slide bearing interchangeable with the shear member slide bearing.

* * * * *